United States Patent
Hong et al.

(10) Patent No.: US 10,968,871 B2
(45) Date of Patent: Apr. 6, 2021

(54) ENGINE SYSTEM AND METHOD OF CONTROLLING THE SAME

(71) Applicants: Hyundai Motor Company, Seoul (KR); Kia Motors Corporation, Seoul (KR)

(72) Inventors: Seungwoo Hong, Seoul (KR); Jong Il Park, Seoul (KR); Heechang Oh, Suwon-si (KR); Kwanhee Lee, Suwon-si (KR); Jaegu Kang, Seoul (KR); Dong Hee Han, Seoul (KR); Yeongseop Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 15 days.

(21) Appl. No.: 16/517,983

(22) Filed: Jul. 22, 2019

(65) Prior Publication Data

US 2020/0182202 A1 Jun. 11, 2020

(30) Foreign Application Priority Data

Dec. 7, 2018 (KR) .......................... 10-2018-0157494

(51) Int. Cl.
*F02M 26/00* (2016.01)
*F02M 26/41* (2016.01)
(Continued)

(52) U.S. Cl.
CPC ............. *F02M 26/41* (2016.02); *F01N 13/10* (2013.01); *F02B 47/08* (2013.01); *F02M 35/104* (2013.01)

(58) Field of Classification Search
CPC ........ F02M 26/41; F02M 26/08; F02M 26/13; F02M 26/47; F02M 26/51; F02M 35/104; F01N 13/10; F02B 47/08; F02B 39/10; F02B 39/16; F02D 41/0007; Y02T 10/12; B60K 6/48
See application file for complete search history.

(56) References Cited

U.S. PATENT DOCUMENTS

6,129,524 A * 10/2000 Woollenweber ........ F04D 17/12
417/366
10,145,320 B1 * 12/2018 Zeng ...................... F02M 26/49
(Continued)

*Primary Examiner* — Phutthiwat Wongwian
*Assistant Examiner* — Sherman D Manley
(74) *Attorney, Agent, or Firm* — Morgan, Lewis & Bockius LLP (57) ABSTRACT

An engine system may include an engine including a plurality of intake lines through which outside air supplied to combustion chamber flows, a first electric supercharger and a second electric supercharger disposed respectively in the plurality of intake lines, a first exhaust gas recirculation (EGR) device including a first EGR line branched from an exhaust manifold and joining an intake manifold and a first EGR valve disposed in the first EGR line, and a controller determining an engine target torque according to a driving condition of the engine, setting an engine torque within an operation region of the first EGR device when the engine target torque is in a torque dead band between the operation region of the first EGR device and a non-operation region thereof, and compensating a difference value between the engine target torque and the engine torque by a hybrid electric vehicle (HEV) motor.

18 Claims, 6 Drawing Sheets

(51) Int. Cl.
*F02M 35/104* (2006.01)
*F01N 13/10* (2010.01)
*F02B 47/08* (2006.01)

(56) References Cited

U.S. PATENT DOCUMENTS

| | | | |
|---|---|---|---|
| 10,280,850 B1* | 5/2019 | Zeng | F02B 37/18 |
| 2017/0335754 A1* | 11/2017 | Xiao | F02B 39/10 |
| 2018/0030934 A1* | 2/2018 | Lee | F02B 37/16 |
| 2018/0334954 A1* | 11/2018 | Banker | F02B 33/44 |
| 2018/0361844 A1* | 12/2018 | Kinzuka | B60K 6/24 |
| 2019/0003379 A1* | 1/2019 | Kemmerling | F02M 26/09 |
| 2019/0063347 A1* | 2/2019 | Xiao | F02D 41/26 |
| 2019/0063348 A1* | 2/2019 | Xiao | F02D 11/02 |
| 2019/0153916 A1* | 5/2019 | Kelly | F02B 39/10 |
| 2019/0186390 A1* | 6/2019 | Kelly | F02B 33/40 |
| 2019/0186427 A1* | 6/2019 | Hong | F02M 26/09 |
| 2020/0086715 A1* | 3/2020 | Pursifull | B60H 1/143 |

* cited by examiner

ENGINE SYSTEM AND METHOD OF CONTROLLING THE SAME

CROSS-REFERENCE TO RELATED APPLICATION

The present application claims priority to Korean Patent Application No. 10-2018-0157494 filed on Dec. 7, 2018, the entire contents of which is incorporated herein for all purposes by this reference.

BACKGROUND OF THE INVENTION

Field of the Invention

The present invention relates to an engine system and a method of controlling the same. More particularly, the present invention relates to an engine system capable of continuously supplying recirculation exhaust gas (EGR) in a hybrid electric vehicle (HEV) and a method of controlling the same.

Description of Related Art

An engine of a vehicle generates the power by mixing the air introduced from the outside thereof with the fuel in an appropriate ratio and burning it.

In a process of generating the power by driving the engine, the external air for the combustion may be appropriately supplied to obtain a desired output and combustion efficiency. For this, a turbocharger as a device configured for turbocharging the air for the combustion to increase the combustion efficiency of the engine is used.

In general, a turbocharger is a device that rotates a turbine by use of pressure of exhaust gas discharged from an engine and thereby increases output of the engine by supplying high-pressure air to a combustion chamber by use of rotational force thereof. The turbocharger is applied to most diesel engines and has also recently been applied to gasoline engines.

As another example of an intake boost device, an electric supercharger using a motor to drive a compressor to compress external air has been used. Since the electric supercharger is driven by a battery, there is little boost, and it mainly supplies supercharged air to the combustion chamber in a low speed and low load region.

In general, a turbocharger (hereinafter, referred to as a 'mechanical turbocharger') operated by exhaust gas has a low responsiveness and a high back pressure, which makes it difficult to realize a high compression ratio. Since the turbocharger is exposed to high temperature (about 700 degrees Celsius) exhaust gas, the design cost of components around the turbocharger increases.

And nitrogen oxide (NOx) contained in the exhaust gas from the engine not only causes acid rain, but it also stimulates the eyes and respiratory system and causes the plant to die. These NOx are regulated as major air pollutants, and many studies are under way to reduce the NOx emissions.

An exhaust gas recirculation (EGR) system is a system mounted on a vehicle for the reduction of hazardous emissions. Generally, NOx is increased when the proportion of air in the mixer is high and the combustion is good. Therefore, the exhaust gas recirculation system mixes a part of the exhaust gas (for example, 5 to 20%) discharged from the engine back into the mixer, reducing the amount of oxygen in the mixer and interfering with the combustion, suppressing the generation of NOx.

A common exhaust gas recirculation system is provided to exhaust the exhaust gas flowing through the exhaust line from the cylinder of the engine through the exhaust manifold to the cylinder of the engine through the recirculation line and an EGR valve is mounted in the recirculation line to control the EGR rate.

Such an exhaust gas recirculation system may be classified into a low-pressure exhaust gas recirculation (LP EGR) device and a high-pressure exhaust gas recirculation (HP EGR) device.

In the conventional exhaust gas recirculation system, the exhaust gas is recirculated through the EGR line branched at the exhaust line through which the exhaust gas flows and joining the intake line. At the instant time, the EGR line is provided with an exhaust gas recirculation (EGR) cooler for cooling the recirculated exhaust gas and an EGR valve for regulating the amount of exhaust gas recirculated.

Among the conventional exhaust gas recirculation devices, the high-pressure EGR device supplies the recirculating gas (EGR gas) to the intake manifold by use of the high pressure of the exhaust manifold. In the operation region in which the pressure of the intake manifold is increased (for example, Turbocharger or electric supercharger), the differential pressure between the exhaust manifold and the intake manifold is low, which makes it difficult to supply the recirculating gas, thus limiting the operation range in which the recirculating gas is supplied.

The low-pressure EGR device supplies the recirculating gas from the exhaust line downstream of the exhaust gas purifying device to the intake line upstream of the compressor of the turbocharger. When the recirculating gas is supplied, since the amount of the reducing agent is reduced, the operation range in which the recirculating gas is supplied is limited. Furthermore, the control logic for supplying the recirculating gas is complicated, and the manufacturing cost is increased.

Thus, conventionally, a separate exhaust gas recirculation system may be provided for exhaust gas recirculation, which increases the manufacturing cost of the vehicle and deteriorates the degree of freedom of design in the engine compartment.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an engine system of a new structure in which an operation region configured for supplying a recirculating gas is expanded.

An engine system according to an exemplary embodiment of the present invention may include an engine including a plurality of combustion chambers generating driving torque by combustion of fuel, a plurality of intake lines through which outside air supplied to the combustion chamber flows, an intake manifold disposed on an intake side of the combustion chamber, an exhaust manifold disposed on an exhaust side of the combustion chamber, an exhaust line connected to the exhaust manifold and through which the exhaust gas flows, a first electric supercharger and a second electric supercharger disposed respectively in the plurality of intake lines, a first exhaust gas recirculation (EGR) device including a first EGR line branched from the exhaust manifold and joining the intake manifold and a first EGR valve disposed in the first EGR line, and a controller determining an engine target torque according to a driving condition of the engine, setting an engine torque within an operation region of the first EGR device when the engine target torque is in a torque dead band between the operation region of the first EGR device and a non-operation region thereof, and compensating a difference value between the engine target torque and the engine torque by a hybrid electric vehicle (HEV) motor.

The plurality of intake line may include a first intake line through which outside air supplied to the combustion chamber flows, a second intake line through which outside air supplied to the combustion chamber flows, and a bypass line connecting the first intake line and the second intake line.

An engine system according to an exemplary embodiment of the present invention may further include a first intake valve disposed in the first intake line, a second intake valve disposed in the second intake line, and a bypass valve disposed in the bypass line.

The first intake valve may be disposed downstream of the first electric supercharger, and the second intake valve may be disposed upstream of the second electric supercharger.

An engine system according to an exemplary embodiment of the present invention may further include an exhaust gas purifying apparatus mounted between the exhaust manifold and the exhaust line and configured for purifying exhaust gas between the exhaust manifold and the exhaust line.

The first intake line and the second intake line may join a main intake line connected to the intake manifold, and a main intercooler may be disposed in the main intake line.

An engine system according to an exemplary embodiment of the present invention may further include an auxiliary intercooler disposed in the bypass line.

The first EGR device may further include a first EGR cooler disposed in the first EGR line for cooling the exhaust gas passing through the first EGR line.

An engine system according to various exemplary embodiments of the present invention may further include a second EGR device including a second EGR line branched from the exhaust line and joining the first intake line, and a second EGR valve disposed in the second EGR line.

The second EGR device may further include a second EGR cooler disposed in the second EGR line for cooling the exhaust gas passing through the second EGR line.

An engine system according to various exemplary embodiments of the present invention may further include a turbocharger disposed in the intake line.

A 3-way EGR valve may be disposed in the intake line at the front end portion of the turbocharger.

The controller may detect the driving information including engine speed and engine torque, determine the engine target torque according to the driving information, determine a target air amount required to achieve the engine target torque, determine a target intake air pressure to satisfy the target air amount, and determine that the engine target torque is in a torque dead band between the operation region of the first EGR device and a non-operation region thereof if the ratio of the target intake air pressure to the atmospheric pressure is less than or equal to a specific value greater than 1.

When the engine target torque is in a torque dead band between the operation region of the first EGR device and a non-operation region thereof, the controller may set the engine torque lower than a predetermined value, control the first and second electric superchargers not to operate, control the first EGR device to operate, and control the intake camshaft (in-cam) to advance.

Meanwhile, a method of controlling an engine system including an engine, an electric supercharger for supplying supercharged air to the engine, and an exhaust gas recirculation (EGR) device configured for recirculating the exhaust gas to the engine may include detecting the driving information including engine speed and engine torque, determining, by a controller, an engine target torque according to the driving information, determining, by the controller, a target air amount required to achieve the engine target torque, determining, by the controller, a target intake air pressure to satisfy the target air amount, determining, by the controller, whether the ratio of the target intake air pressure to the atmospheric pressure is less than or equal to a specific value, and by the controller, setting an engine torque lower than a predetermined value, controlling the electric supercharger not to operate, controlling the EGR device to operate, controlling the intake camshaft (in-cam) to advance, and controlling a hybrid electric (HEV) motor to drive to compensate a difference value between the engine target torque and the engine torque if the ratio of the target intake air pressure to the atmospheric pressure is less than or equal to the specific value.

The method of the engine system according an exemplary embodiment of the present invention may further include in the determining, by the controller, whether the ratio of the target intake air pressure to the atmospheric pressure is less than or equal to a specific value, if the ratio of the target intake air pressure to the atmospheric pressure exceeds the specific value, controlling the electric supercharger to operate, and controlling the EGR device not to operate.

The specific value may be greater than 1.

As described above, the engine system according to exemplary embodiments of the present invention, an operation region configured for supplying a recirculating gas is expanded, fuel efficiency of the vehicle is improved.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

Furthermore, in exemplary embodiments of the present invention, since like reference numerals designate like elements having the same configuration, various exemplary embodiments is representatively described, and in other exemplary embodiments of the present invention, only configurations different from the various exemplary embodiments will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. Also, to the same structure, element, or component appearing in more than one of the figures, the same reference numerals are used to denote similar features. It will be understood that when an element such as a layer, film, region, or substrate is referred to as being "on" another element, it may be directly on the other element or intervening elements may also be present.

The exemplary embodiment of the present invention shows an exemplary embodiment of the present invention in detail. As a result, various modifications of the drawings will be expected. Therefore, the exemplary embodiment of the present invention is not limited to a specific aspect of the illustrated region, and for example, may include modifications of an aspect by manufacturing.

Now, an engine system according to an exemplary embodiment of the present invention will be described with reference to FIG. 1.

Figure 1:
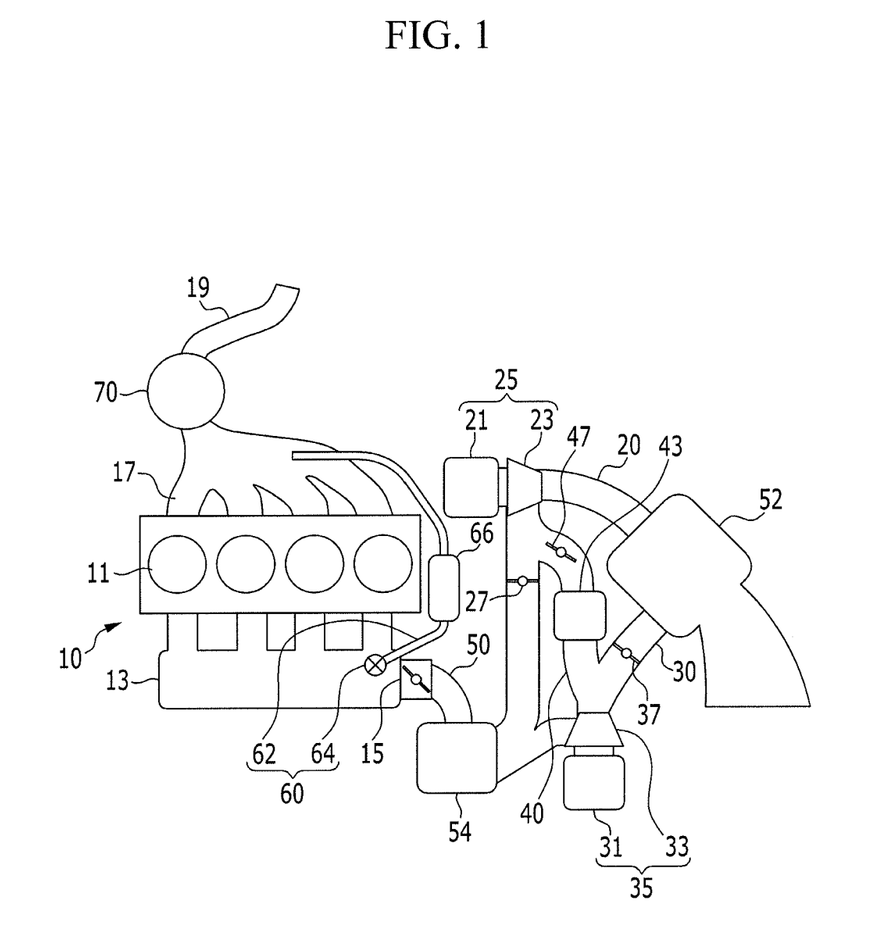
FIG. 1 is a conceptual diagram showing a configuration of an engine system according to an exemplary embodiment of the present invention.

FIG. 1 is a conceptual diagram showing a configuration of an engine system according to an exemplary embodiment of the present invention.

Referring to FIG. 1, the engine system includes an engine 10, a plurality of intake lines 20 and 30, an intake manifold 13, an exhaust manifold 17, an exhaust line 19, a first electric supercharger 25 and a second electric supercharger 35, a first exhaust gas recirculation device 60 and a controller 90.

The engine 10 includes a plurality of combustion chambers 11 for generating a driving force by combustion of fuel, the intake air supplied to the combustion chamber 11 is supplied through the intake line 20, and the exhaust gas discharged from the combustion chamber 11 of the engine 10 is discharged to the outside through the exhaust manifold 17 and the exhaust line 19. At the instant time, an exhaust gas purifying device 70 may be provided in the exhaust line 19 for purifying the exhaust gas.

The plurality of intake lines 20 and 30 may include a first intake line 20 through which outside air supplied to the combustion chamber 11 flows and a second intake line 30 through which outside air supplied to the combustion chamber 11 flows. However, the scope of the present invention is not limited thereto.

A bypass line connecting the first intake line 20 and the second intake line 30 is disposed between the first intake line 20 and the second intake line 30. That is, the bypass line 40 is branched from the first intake line 20 and joins the second intake line 30.

The first electric supercharger 25 and the second electric supercharger 35 respectively disposed in the first intake line 20 and the second intake line 30 are for supplying supercharged air to the combustion chamber 11, and includes motors 21 and 31 and electric compressors 23 and 33. The electric compressors 25 and 35 are operated by the motors 21 and 31 to compress the outside air according to the driving conditions and supply the compressed air to the combustion chamber 11.

The first intake valve 27 is disposed in the first intake line 20. The first intake valve 27 may be disposed downstream of the first electric supercharger 25 disposed in the first intake line 20. The amount of intake air supplied through the first intake line 20 is regulated by the amount of opening of the first intake valve 27.

The second intake valve 37 is disposed in the second intake line 30. The second intake valve 37 may be disposed upstream of the second electric supercharger 35 disposed in the second intake line 30. The amount of intake air supplied through the second intake line 30 is regulated by the amount of opening of the second intake valve 37.

The first intake line 20 and the second intake line 30 may join a main intake line 50, and a main intercooler 54 may be disposed in the main intake line 50. The air compressed by the first electric supercharger 25 and the second electric supercharger 35 is cooled by the main intercooler 54.

The bypass valve 47 is disposed in the bypass line 40. At the instant time, an auxiliary intercooler 43 may be disposed in the bypass line 40. The air compressed by the first electric supercharger 25 is cooled by the auxiliary intercooler 43.

An air cleaner 52 for filtering outside air flowing into from the outside thereof is disposed at the inlet of the first intake line 20 and the second intake line 30.

The intake air flowing through the first intake line 20 and the second intake line 30 is supplied to the combustion chamber 11 through the intake manifold 13. A throttle valve 15 is disposed on the intake manifold 13 to regulate the air amount supplied to the combustion chamber 11.

As shown in FIG. 1, the first exhaust gas recirculation (EGR) device 60 includes a first EGR line 62 branched from the exhaust manifold 17 and joining the intake manifold 13 and a first EGR valve 64 disposed in the first EGR line 62. Furthermore, the first EGR device 60 may further include a first EGR cooler 66 disposed in the first EGR line 62 for cooling the exhaust gas passing through the first EGR line 62.

Meanwhile, the controller 90 determines an engine target torque according to a driving condition of the engine 10, sets the engine torque within an operation region of the first EGR device 60 when the engine target torque is in a torque dead band between the operation region of the EGR device 60 and a non-operation region, and compensates a difference value between the engine target torque and the engine torque by a hybrid electric vehicle (HEV) motor drive to the engine torque.

Figure 6:
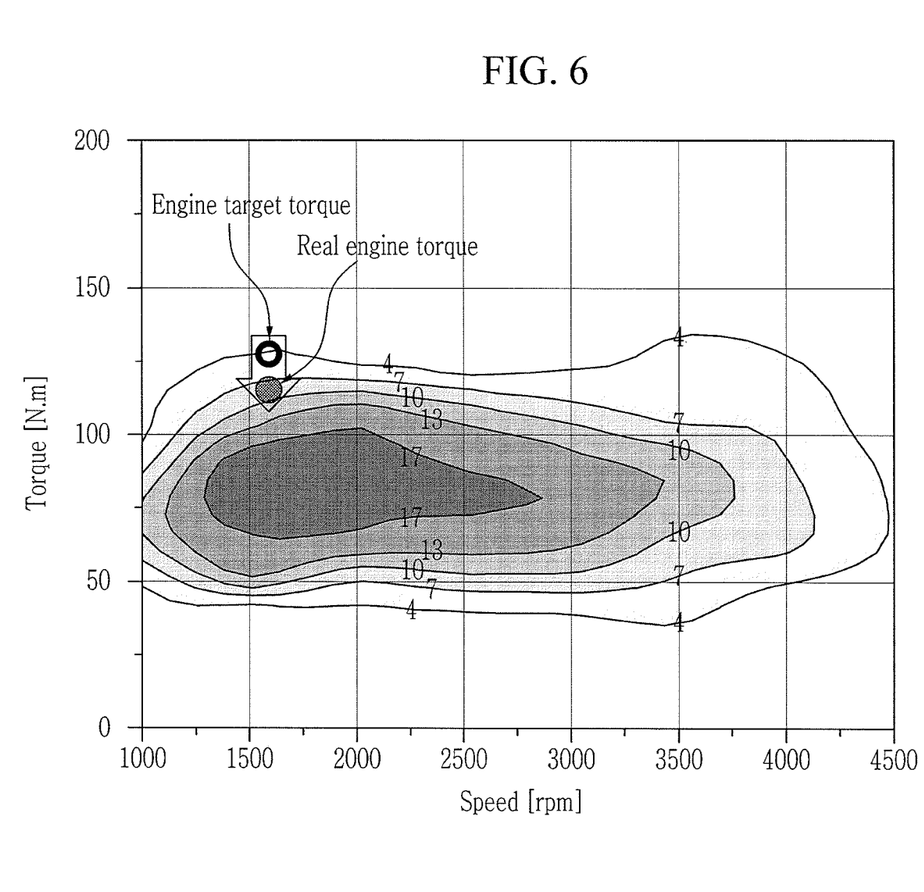
FIG. 6 is a graph showing an EGR supply amount according to an operation region of an engine according to an exemplary embodiment of the present invention.

As shown in FIG. 6, when the engine target torque is first determined according to the engine operation conditions, the controller is configured to determine whether the engine target torque is in a torque dead band between the operating region of the EGR device 60 and the non-operating region. When the engine target torque is in the torque dead band between the operating region of the EGR device 60 and the non-operating region, the engine torque is set in the EGR apparatus operating region. The difference between the engine target torque and the engine torque may be compensated by driving the HEV motor.

Figure 2:
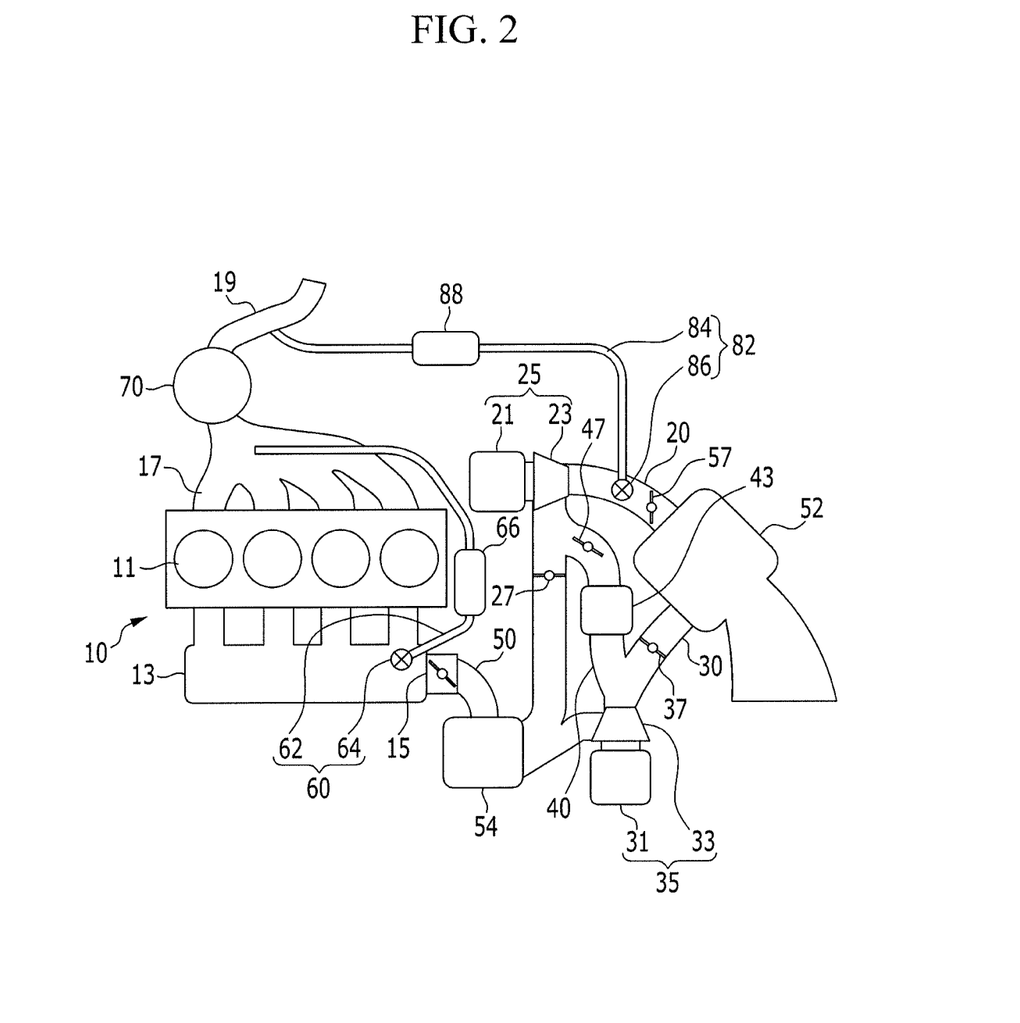
FIG. 2 is a conceptual diagram showing a configuration of an engine system according to various exemplary embodiments of the present invention.

FIG. 2 is a conceptual diagram showing a configuration of an engine system according to various exemplary embodiments of the present invention. As shown in FIG. 2, the engine system may further include the second EGR device 82 including a second EGR line 84 branched at the exhaust line 19 and joining the first intake line 20 and a second EGR valve 86 disposed at the second EGR line 84.

The second EGR device 82 may further include a second EGR cooler 88 disposed in the second EGR line 84 for cooling the exhaust gas passing through the second EGR line 84. The second EGR device 82 may be a device in which exhaust gas relatively low in pressure is circulated as compared with the first EGR device 60.

Figure 3:
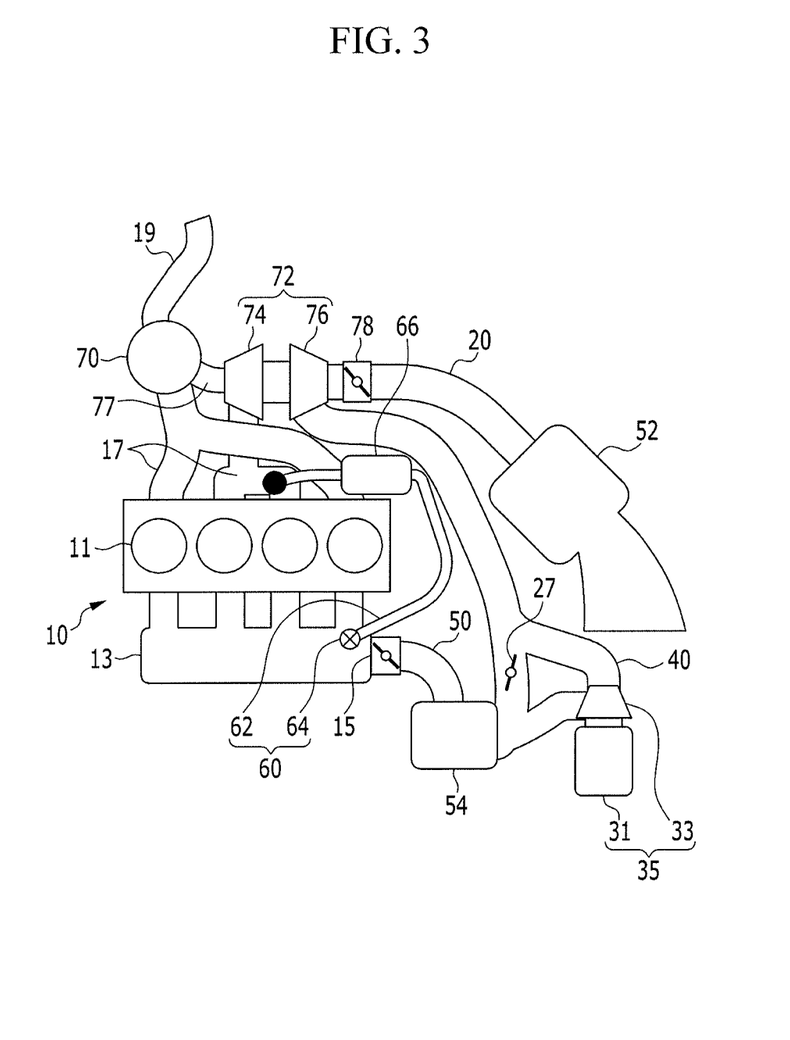
FIG. 3 is a conceptual diagram showing a configuration of an engine system according to various exemplary embodiments of the present invention.

FIG. 3 is a conceptual diagram showing a configuration of an engine system according to various exemplary embodiments of the present invention.

Referring to FIG. 3, the engine system includes an engine 10, an intake line 20, an intake manifold 13, an exhaust manifold 13, an exhaust line 19, a turbocharger 72, and an EGR device 60.

The EGR device 60 includes an EGR line 62 and an EGR valve 64 disposed in the EGR line 62. The EGR line 62 is branched from the exhaust manifold 17 connected to the turbine 74 of the turbocharger 72 and joins the intake manifold 13.

The turbocharger 72 is disposed in the intake line 20 and the electric supercharger 35 may be disposed in the bypass line 40 branched from the intake line 20.

The turbocharger 72 is for supplying supercharged air to the combustion chamber 11 like the electric supercharger 35 and includes a compressor 76 and a turbine 74. The outside air flowing through the intake line 20 is compressed by the compressor 76 of the turbocharger 72 and supplied to the combustion chamber 11 through the intake manifold 13. Furthermore, the turbine 74 of the turbocharger 72 is rotated by the pressure of the combustion gas discharged from the exhaust manifold 17 of the engine 10 to the exhaust gas purification device 70 through a branch line 77 connecting the turbine 74 and the exhaust gas purification device 70, and by use of the present rotational force, the outside air drawn in from the intake line 20 may be pushed into a pressure higher than atmospheric pressure, and the output of the engine 10 may be increased.

A 3-way EGR valve 78 may be disposed in the intake line 20 at the front end portion of the turbocharger, and therefore, the amount of outside air drawn in from the intake line 20 into the compressor 76 of the turbocharger 72 may be regulated according to the amount of opening of the 3-way EGR valve 78.

An exhaust gas purifying device 70 for purifying the exhaust gas may be further provided in the exhaust line 19 where the downstream of the exhaust manifold 17 and the turbine 74 of the turbocharger 72 are joined.

Furthermore, the intake line 20 and the bypass line may join the main intake line 50 and the main intake line 50 may be provided with a main intercooler 54.

The EGR device 60 may further include an exhaust gas recirculation (EGR) cooler 66 disposed in the EGR line 62 for cooling the exhaust gas passing through the EGR line 62.

Figure 4:
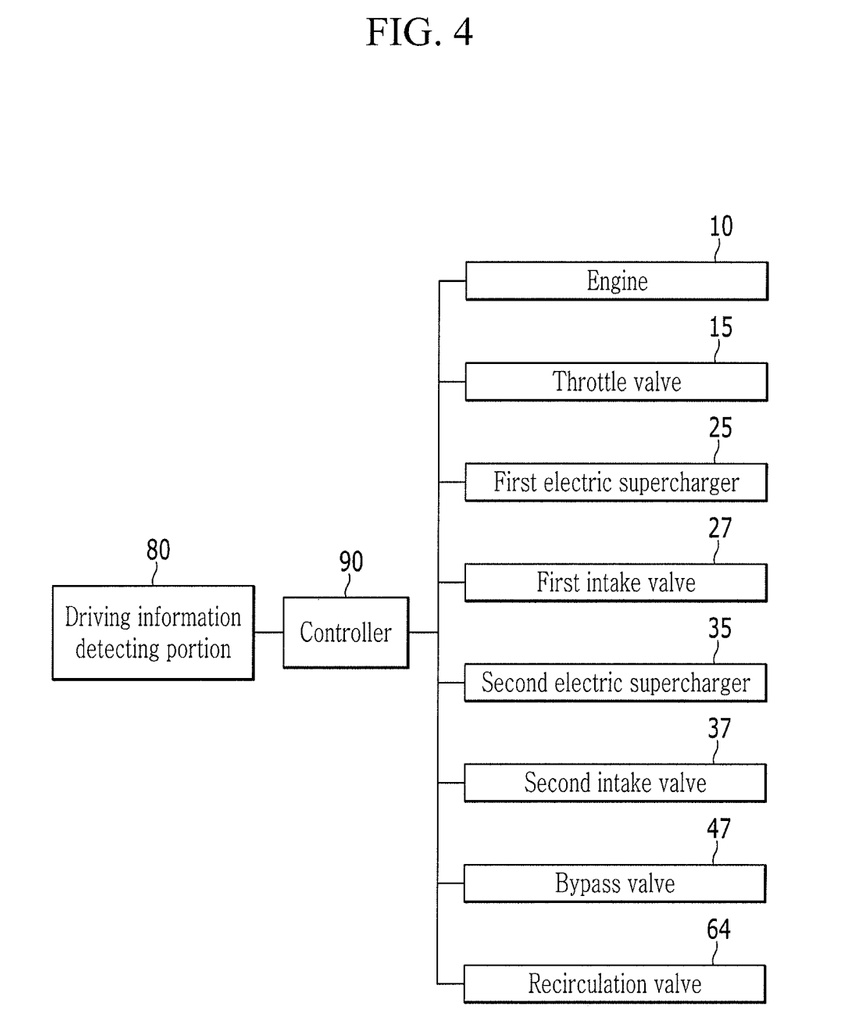
FIG. 4 is a block diagram showing the configuration of an engine system according to an exemplary embodiment of the present invention.

FIG. 4 is a block diagram showing the configuration of an engine system according to an exemplary embodiment of the present invention.

Referring to FIG. 4, the engine system according to an exemplary embodiment of the present invention may further include a driving information detecting portion 80, and a controller 90 controlling operation of the engine 10, the intake valve 27, the second intake valve 37, the bypass valve 47, the first electric supercharger 25, the second electric supercharger 35, the exhaust gas recirculation (EGR) valve 64, and the throttle valve 15 according to the driving information.

The driving information detecting portion 80 detects the driving information including the engine torque, the engine speed, the driver's requested torque, and the like, and the detected driving information is transmitted to the controller 90.

The controller 90 may be provided with one or more processors that operate according to the set program, and the set program is configured to perform each step of the control method of the engine system according to the exemplary embodiment of the present invention.

Figure 5:
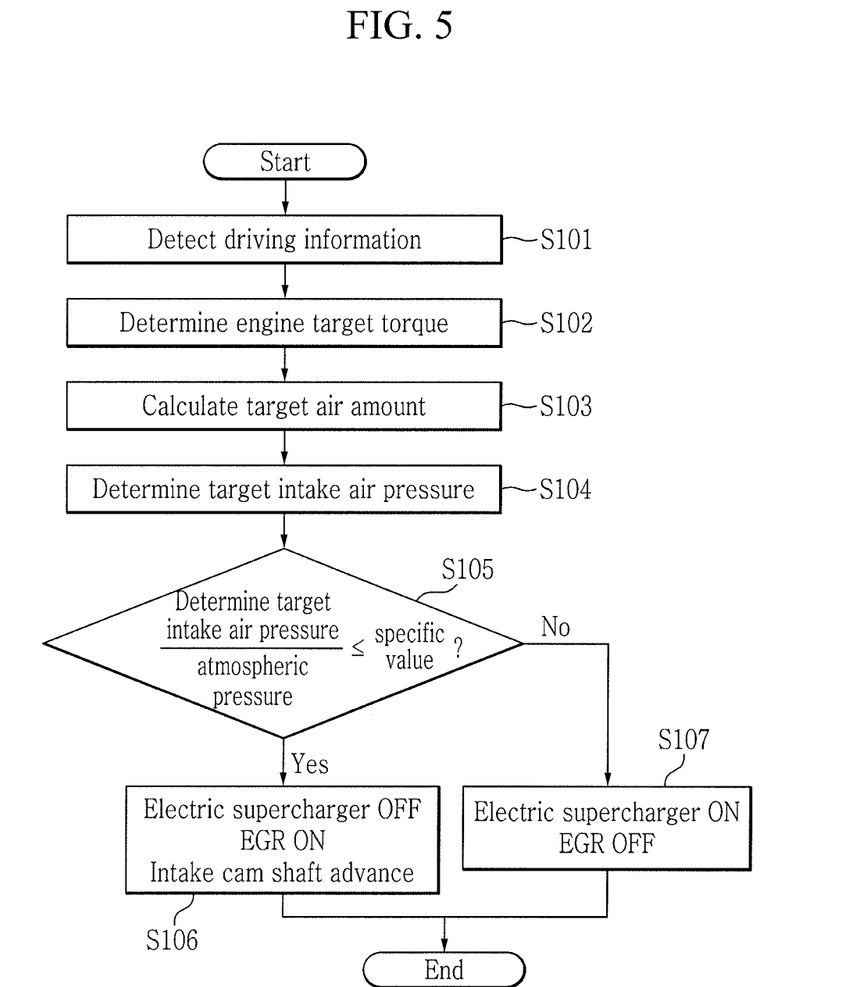
FIG. 5 is a flowchart illustrating a method of controlling an engine system according to an exemplary embodiment of the present invention.

FIG. 5 is a flowchart illustrating a method of controlling an engine system according to an exemplary embodiment of the present invention.

A method of controlling an engine system including an engine 10, an electric supercharger for supplying supercharged air to the engine, and an exhaust gas recirculation (EGR) device configured for recirculating the exhaust gas to the engine according to an exemplary embodiment of the present invention firstly includes detecting the driving information including engine speed and engine torque S101. The driving information detecting portion detects the driving information including the engine torque, the engine speed, the driver's required torque, and the like, and the detected driving information is transmitted to the controller.

As such, an engine target torque is determined, by a controller, according to the driving information S102.

As such, a target air amount required to achieve the engine target torque is determined by the controller S103.

As such, a target intake air pressure to satisfy the target air amount is determined by the controller S104.

As such, whether the ratio of the target intake air pressure to the atmospheric pressure is less than or equal to a specific value is determined by the controller S105. By the controller, the engine torque is set lower than a predetermined value, the electric supercharger is controlled not to operate, the EGR device is controlled to operate, the intake camshaft (in-cam) is controlled to advance, and a hybrid electric (HEV) motor is controlled to drive to compensate a difference value between the engine target torque and the engine torque if the ratio of the target intake air pressure to the atmospheric pressure is less than or equal to the specific value S106. At the instant time, the specific value may be set to a value greater than 1 at a level that does not hinder the drivability of the vehicle.

As such, if the ratio of the target intake air pressure to the atmospheric pressure exceeds the specific value, the controller controls the electric supercharger to operate, and controls the EGR device not to operate S107.

Like this, an operation region configured for supplying a recirculating gas is expanded, fuel efficiency of the vehicle is improved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An engine system, comprising:
   an engine including at least a combustion chamber generating driving torque by combustion of fuel;
   at least an intake line through which outside air supplied to the at least a combustion chamber flows;
   an intake manifold mounted on an intake side of the at least a combustion chamber and connected to the at least an intake line;
   an exhaust manifold mounted on an exhaust side of the at least a combustion chamber;
   an exhaust line connected to the exhaust manifold and through which the exhaust gas flows;
   a first electric supercharger mounted in the at least an intake line;
   a first exhaust gas recirculation (EGR) device including a first EGR line branched from the exhaust manifold and joining the intake manifold and a first EGR valve mounted in the first EGR line; and
   a controller configured for determining an engine target torque according to driving information of the engine, setting an engine torque within an operation region of the first EGR device when the engine target torque is in a torque dead band between the operation region of the first EGR device and a non-operation region thereof, and compensating a difference value between the engine target torque and the engine torque by a hybrid electric vehicle (HEV) motor,
   wherein a second electric supercharger is mounted in the at least an intake line,
   wherein the at least an intake line includes:
      a first intake line through which first outside air supplied to the at least a combustion chamber flows;
      a second intake line through which second outside air supplied to the at least a combustion chamber flows; and
      a bypass line connecting the first intake line and the second intake line, and
   wherein the second electric supercharger is connected to the second intake line and the bypass line.

2. The engine system of claim 1, further including:
   a first intake valve mounted in the first intake line to which the first electric supercharger is mounted;
   a second intake valve mounted in the second intake line to which the second electric supercharger is mounted; and
   a bypass valve mounted in the bypass line.

3. The engine system of claim 2,
   wherein the first intake valve is mounted upstream of the first electric supercharger, and
   wherein the second intake valve is mounted upstream of the second electric supercharger.

4. The engine system of claim 1, further including:
   an exhaust gas purifying apparatus mounted between the exhaust manifold and the exhaust line and configured for purifying exhaust gas between the exhaust manifold and the exhaust line.

5. The engine system of claim 1,
   wherein the first intake line and the second intake line join a main intake line connected to the intake manifold, and a main intercooler is mounted in the main intake line.

6. The engine system of claim 1, further including:
   an auxiliary intercooler mounted in the bypass line.

7. The engine system of claim 1,
   wherein the first EGR device further includes a first EGR cooler mounted in the first EGR line for cooling the exhaust gas passing through the first EGR line.

8. The engine system of claim 7, further including:
   a second EGR device including a second EGR line branched from the exhaust line and joining the first intake line, and a second EGR valve mounted in the second EGR line.

9. The engine system of claim 8,
   wherein the second EGR device further includes a second EGR cooler mounted in the second EGR line for cooling exhaust gas passing through the second EGR line.

10. The engine system of claim 1, further including a turbocharger mounted in one of the at least an intake line.

11. The engine system of claim 10,
    wherein the turbocharger includes a compressor and a turbine,
    wherein the compressor is mounted in the one of the at least an intake line, and
    wherein the turbine of the turbocharger is mounted in a branch line connecting the exhaust line and the exhaust manifold.

12. The engine system of claim 11, wherein the exhaust manifold and the branch line are connected to an exhaust gas purification device.

13. The engine system of claim 10,
    wherein a 3-way EGR valve is mounted in the intake line upstream of the turbocharger.

14. An engine system, comprising:
    an engine including at least a combustion chamber generating driving torque by combustion of fuel;

at least an intake line through which outside air supplied to the at least a combustion chamber flows;

an intake manifold mounted on an intake side of the at least a combustion chamber and connected to the at least an intake line;

an exhaust manifold mounted on an exhaust side of the at least a combustion chamber;

an exhaust line connected to the exhaust manifold and through which the exhaust gas flows;

a first electric supercharger mounted in the at least an intake line;

a first exhaust gas recirculation (EGR) device including a first EGR line branched from the exhaust manifold and joining the intake manifold and a first EGR valve mounted in the first EGR line; and a controller configured for determining an engine target torque according to driving information of the engine, setting an engine torque within an operation region of the first EGR device when the engine target torque is in a torque dead band between the operation region of the first EGR device and a non-operation region thereof, and compensating a difference value between the engine target torque and the engine torque by a hybrid electric vehicle (HEV) motor, wherein a second electric supercharger is mounted in the at least an intake line, and wherein the controller is configured to detect the driving information including a engine speed and the engine torque, to determine the engine target torque according to the driving information, to determine a target air amount required to achieve the engine target torque, to determine a target intake air pressure to satisfy the target air amount, and to conclude that the engine target torque is in the torque dead band between the operation region of the first EGR device and the non-operation region thereof when a ratio of the target intake air pressure to an atmospheric pressure is less than or equal to a first predetermined value greater than 1.

15. The engine system of claim 14, wherein when the engine target torque is in the torque dead band between the operation region of the first EGR device and the non-operation region thereof, the controller sets the engine torque lower than a second predetermined value, controls the first and second electric superchargers not to operate, controls the first EGR device to operate, and controls an intake camshaft to advance.

16. A method of controlling an engine system including an engine, an electric supercharger for supplying supercharged air to the engine, and an exhaust gas recirculation (EGR) device configured for recirculating the exhaust gas to the engine, the method comprising:

detecting driving information including engine speed and engine torque;

determining, by a controller, an engine target torque according to the driving information;

determining, by the controller, a target air amount required to achieve the engine target torque;

determining, by the controller, a target intake air pressure to satisfy the target air amount;

determining, by the controller, when a ratio of the target intake air pressure to an atmospheric pressure is less than or equal to a predetermined value; and by the controller, setting an engine torque lower than a first predetermined value, controlling the electric supercharger not to operate, controlling the EGR device to operate, controlling an intake camshaft to advance, and controlling a hybrid electric (HEV) motor to drive to compensate a difference value between the engine target torque and the engine torque when the ratio of the target intake air pressure to the atmospheric pressure is less than or equal to the predetermined value.

17. The method of claim 16, further including:

when the ratio of the target intake air pressure to the atmospheric pressure exceeds the predetermined value, controlling, by the controller, the electric supercharger to operate, and controlling the EGR device not to operate.

18. The method of claim 16, wherein the predetermined value is greater than 1.

* * * * *